(12) United States Patent
Hojo et al.

(10) Patent No.: US 8,785,582 B2
(45) Date of Patent: Jul. 22, 2014

(54) VINYLOZY GROUP-CONTAINING VINYL POLYMER

(75) Inventors: Takuma Hojo, Namerikawa (JP); Kyoko Yamamoto, Namerikawa (JP); Hiroki Fujiwara, Namerikawa (JP); Kazuhiko Atsumi, Namerikawa (JP); Take-aki Mitsudo, Uji (JP)

(73) Assignee: Nippon Carbide Industries Co., Ltd., Tokyo (JP)

( * ) Notice: Subject to any disclaimer, the term of this patent is extended or adjusted under 35 U.S.C. 154(b) by 630 days.

(21) Appl. No.: 12/998,030

(22) PCT Filed: Sep. 28, 2009

(86) PCT No.: PCT/JP2009/067287
§ 371 (c)(1),
(2), (4) Date: Mar. 10, 2011

(87) PCT Pub. No.: WO2010/035903
PCT Pub. Date: Apr. 1, 2010

(65) Prior Publication Data
US 2013/0245189 A1    Sep. 19, 2013

(30) Foreign Application Priority Data
Sep. 29, 2008   (JP) ................. 2008-249394

(51) Int. Cl.
*C08F 16/22*    (2006.01)
*C08F 36/20*    (2006.01)
*C08F 236/20*   (2006.01)
*C09D 11/00*    (2014.01)
*C09J 129/10*   (2006.01)
*C09J 145/00*   (2006.01)
*C08F 8/50*     (2006.01)

(52) U.S. Cl.
USPC ........... 526/282; 526/334; 524/543; 524/554; 528/481

(58) Field of Classification Search
USPC ............ 524/554, 543; 526/282, 334; 528/481
See application file for complete search history.

(56) References Cited

U.S. PATENT DOCUMENTS 2,492,169 A * 12/1949 Mast et al. .............. 525/354
5,173,394 A * 12/1992 Hayashi .................. 430/372

FOREIGN PATENT DOCUMENTS

| JP | 02-238029 A  | 9/1990  |
| JP | 03-021947 A  | 1/1991  |
| JP | 04-068348 A  | 3/1992  |
| JP | 10-094596 A  | 4/1998  |
| JP | 2002-155114 A | 5/2002  |
| JP | 2005-082662 A | 3/2005  |
| JP | 2005-113049 A | 4/2005  |
| JP | 3801888 B2   | 5/2006  |
| JP | 2008-260915 A | 10/2008 |

OTHER PUBLICATIONS

Tsukino, et al, "Radical Cyclopolymerization of Divinyl Ether . . .," Macromolecules, vol. 12, No. 3, 387-391, 1979.*
International Search Report mailed on Dec. 15, 2009.

* cited by examiner

*Primary Examiner* — Fred M Teskin
(74) *Attorney, Agent, or Firm* — Rader, Fishman & Grauer PLLC

(57) ABSTRACT

A vinyloxy group-containing vinyl polymer, useful as a heat or light curing reactive prepolymer, containing at least a constituent unit expressed by the following formula (I):

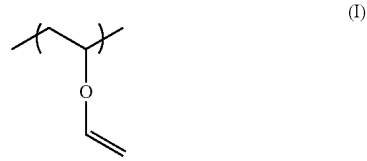

(I)

21 Claims, No Drawings

VINYLOZY GROUP-CONTAINING VINYL POLYMER

TECHNICAL FIELD

The present invention relates to a vinyloxy group-containing vinyl polymer. More particularly, it relates to a vinyloxy group-containing vinyl polymer capable of being easily polymerized or copolymerized with other polymerizable compounds by heat, UV, radiation, electron beam, a cationic polymerization initiator, an acid, etc., in particular, a vinyloxy group-containing vinyl polymer useful as a heat or light curing reactive prepolymer.

BACKGROUND ART

As the method of production of a vinyloxy group-containing polymer, the method of using different types of polymerizable monomers having cationic polymerizable groups of vinyloxy groups and radical polymerizable groups of acrylic acid ester groups in their molecules so as to first perform radical polymerization is known (for example, see PLT 1).

CITATION LIST

Patent Literature 1: Japanese Patent No. 3801888

SUMMARY OF INVENTION

Technical Problem

An object of the present invention is to provide a vinyloxy group-containing vinyl polymer useful as a heat or light curing reactive prepolymer.

Solution to Problem

A vinyloxy group-containing vinyl polymer can be easily polymerized or copolymerized with other polymerizable compound by heat, UV, radiation, electron beam, a cationic polymerization initiator, an acid, etc. and is considered useful as a heat or light curing reactive prepolymer. However, up to now, there has been no vinyl polymers having vinyloxy groups.

In the past, the inventors reported a norbornenyl vinyl ether polymer, which is a novel alicyclic vinyl ether polymer (see Japanese Unexamined Patent Publication (A) No. 2008-260915).

Further, it is known that in general, norbornene, as shown by the following formula, becomes cyclopentadiene and ethylene by a retro Diels-Alder reaction.

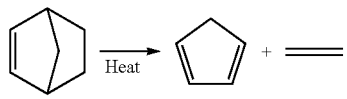

Based on the above, the inventors intensively studied the retro Diels-Alder reaction in norbornenyl vinyl ether polymers and, as a result, discovered that the reaction proceeds like in the following formula, whereby the present invention was completed.

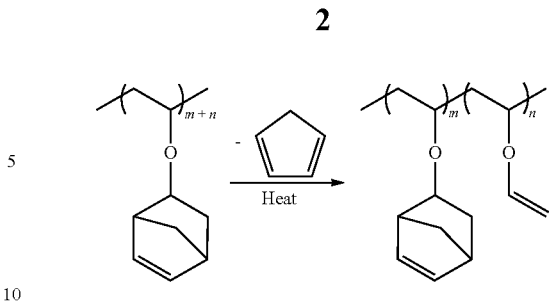

wherein m is an integer of 0 or more, preferably an integer of 0 to 2400, more preferably an integer of 0 to 60, n is an integer of 1 or more, preferably an integer of 1 to 1600, more preferably an integer of 1 to 40.

That is, the vinyloxy group-containing vinyl polymer according to the present invention is a polymer comprising a constituent unit expressed by the following formula (I):

Further, the vinyloxy group-containing vinyl polymer of the present invention is a polymer comprising the following constituent units of (a) and (b):

(a) a constituent unit expressed by the following formula (I) having a vinyloxy group at the side chain thereof:

(b) a constituent unit expressed by the following formula (II):

Further, the vinyloxy group-containing vinyl polymer of the present invention is a vinyloxy group-containing vinyl polymer comprising the following constituent units (a), (b) and (c):

(a) a constituent unit expressed by the following formula (I) having a vinyloxy group at the side chain thereof:

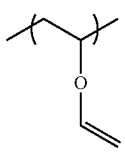
(I)

(b) a constituent unit expressed by the following formula (II):

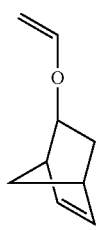
(II)

(c) a constituent unit derived from vinyl ether expressed by the following formula (III):

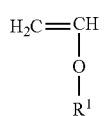
(III)

wherein $R^1$ indicates a monovalent organic group.

Furthermore, the vinyloxy group-containing vinyl polymer of the present invention is a vinyloxy group-containing vinyl polymer comprising the following constituent units of (a) and (c):

(a) a constituent unit expressed by the following formula (I) having a vinyloxy group at the side chain thereof:

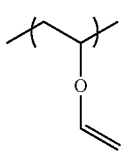
(I)

(c) a constituent unit derived from vinyl ether expressed by the following formula (III):

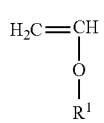
(III)

wherein $R^1$ indicates a monovalent organic group.

Advantageous Effects of Invention

The vinyloxy group-containing vinyl polymer of the present invention is a novel compound having high usability as a heat or light curing reactive prepolymer.

DESCRIPTION OF EMBODIMENTS (Structure)

The vinyloxy group-containing vinyl polymer of the present invention contains a constituent unit expressed by the following formula (I) having a vinyloxy group at the side chain thereof.

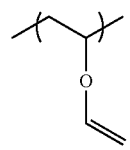
(I)

The vinyloxy group-containing vinyl polymer of the present invention is obtained using a polymer containing a constituent unit derived from norbornenyl vinyl ether expressed by the following formula (IV), as a precursor, and reacting that precursor by a retro Diels-Alder reaction.

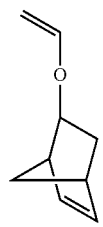
(IV)

That is, the vinyloxy group-containing vinyl polymer of the present invention is a polymer comprising a constituent unit expressed by the following formula (I).

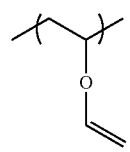
(I)

Further, the vinyloxy group-containing vinyl polymer of the present invention is a polymer comprising the following constituent units (a) and (b).

(a) a constituent unit expressed by the following formula (I) having a vinyloxy group at the side chain thereof:

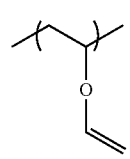
(I)

(b) a constituent unit expressed by the following formula (II):

Further, the vinyloxy group-containing vinyl polymer of the present invention is a vinyloxy group-containing vinyl polymer comprising the following constituent units (a), (b) and (c).

(a) a component unit expressed by the following formula (I) having a vinyloxy group at the side chain thereof:

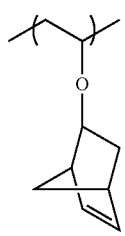
(I)

(b) a constituent unit expressed by the following formula (II):

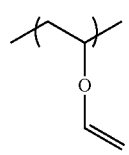
(II)

(c) a constituent unit derived from vinyl ether expressed by the following formula (III):

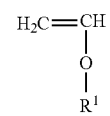
(III)

wherein $R^1$ indicates a monovalent organic group.

Furthermore, the vinyloxy group-containing vinyl polymer of the present invention is a vinyloxy group-containing vinyl polymer comprising the following constituent units (a) and (c).

(a) a constituent unit expressed by the following formula (I) having a vinyloxy group at the side chain thereof:

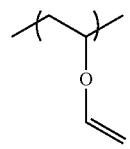
(I)

(c) a constituent unit derived from vinyl ether expressed by the following formula (III):

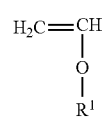
(III)

wherein $R^1$ indicates a monovalent organic group.

Further, when the vinyloxy group-containing vinyl polymer of the present invention contains a constituent unit derived from vinyl ether, it may simultaneously contain two or more different types of constituent units derived from vinyl ether.

The substituent $R^1$ of the formula (III) indicates a monovalent organic group, specifically, $C_1$ to $C_{20}$ alkyl groups such as methyl, ethyl, n-propyl, isopropyl, n-butyl, sec-butyl, tert-butyl, isobutyl, 1-ethylpropyl, neopentyl, n-hexyl, 2-ethylhexyl, dodecyl, octadecyl; $C_3$ to $C_{20}$ alkenyl groups such as allyl, propenyl, isopropenyl; $C_3$ to $C_{20}$ saturated or unsaturated cyclic hydrocarbon groups, such as cyclohexyl, cyclohexyl methyl, norbornyl, norbornylmethyl, adamantyl, —$(R^2O)p$-$R^3$, where p is an integer of 1 to 5, $R^2$ is a $C_2$ to $C_{10}$ chain or cyclic saturated or unsaturated hydrocarbon group and $R^3$ is an alkyl group, alkenyl group, arakyl group or acyl group may be mentioned.

As typical examples of the vinyl ether expressed by the formula (III), methyl vinyl ether, ethyl vinyl ether, n-propyl vinyl ether, isopropyl vinyl ether, n-butyl vinyl ether, sec-butyl vinyl ether, tert-butyl vinyl ether, isobutyl vinyl ether, (1-ethylpropyl)vinyl ether, neopentyl vinyl ether, n-hexyl vinyl ether, cyclohexyl vinyl ether, (cyclohexylmethyl)vinyl ether, 2-ethylhexyl vinyl ether, dodecyl vinyl ether, octadecyl vinyl ether, allyl vinyl ether, norbornyl vinyl ether, norbornylmethyl vinyl ether, norbornenyl methyl vinyl ether, 2-acetoxyethyl vinyl ether, 4-acetoxybutyl vinyl ether, 4-acetoxycyclohexyl vinyl ether, 1-acetoxymethyl-4-cyclohexylmethyl vinyl ether, acetoxydiethyleneglycol monovinyl ether, acetoxytriethyleneglycol monovinyl ether, etc. may be mentioned, although the present invention is not limited to these examples.

The vinyloxy group-containing vinyl polymer of the present invention preferably has a weight average molecular weight, due to the easy polymerization, of 150 to 500,000, more preferably, 150 to 100,000, further preferably 150 to 10,000.

(Method of Synthesis of Precursor of Vinyloxy Group-Containing Vinyl Polymer of Present Invention)

The method of synthesis of the precursor of the vinyloxy group-containing vinyl polymer of the present invention is not particularly limited. Known polymerization method such as cationic polymerization may be used. Further, the living cationic polymerization method, which is known to enable easy control of the polymerization degree, give a polymer close to a monodispersion and give a block copolymer, may also be used.

As the cationic polymerization catalyst, which is used for synthesis of the precursor of the vinyloxy group-containing vinyl polymer of the present invention, for example, it is possible to use catalysts described in "Lecture on Polymerization Reaction Theory, vol. 3 (Toshinobu Higashimura, Kagaku Dojin, 1974)" such as a protonic acid, metal oxides, halogen, halogenated metal, organometallic compound, stable cation, etc. That is, as the protonic acid, hydrogen chloride, sulfuric acid, trifluoroacetic acid, trifluoromethane sulfonic acid; as the metal oxide, iron oxide; as the halogen, iodine; and as the halogenated metal, boron trifluoride, zinc chloride, stannous tetrachloride, iron chloride or titanium tetrachloride, and, as the organometallic compound, ethyl aluminum chloride may be used, although the present invention is not limited to these examples. Among these, hydrogen chloride, trifluoromethane sulfonic acid, boron trifluoride, zinc chloride and iron chloride are preferably used.

As the living cationic polymerization catalyst, which is used for synthesis of the precursor of the vinyloxy group-containing vinyl polymer according to the present invention, for example, these described in "Experimental Chemistry Course, Vol. 26 (5th Edition, Maruzen, 2005)", such as an initiator, Lewis acid, base, salt, etc. may be used. That is, as the initiator, a vinyl ether-hydrogen chloride adduct, vinyl ether-trifluoroacetic acid adduct and vinyl ether-acetic acid adduct; as the Lewis acid, zinc chloride, tin tetrachloride, iron chloride and titanium tetrachloride; as the base, ethyl acetate, diethyl ether, tetrahydrofuran and 1,4-dioxane; and, as the salt, a quaternary ammonium salt etc. may be used, although the present invention is not limited to these examples. Among these, as the initiator, a vinyl ether-hydrogen chloride adduct, vinyl ether-trifluoroacetic acid adduct; as the Lewis acid, zinc chloride, iron chloride; and as the base, ethyl acetate, diethyl ether, tetrahydrofuran, 1,4-dioxane are preferably used.

As the combination of the initiator, Lewis acid, addition base and addition salt, an initiator system comprising a combination of an initiator with a relatively weak Lewis acid, a system of an initiator system comprising a combination of an initiator with a relatively strong Lewis acid, to which system a Lewis base is added, and a system of an initiator system comprising an combination of an initiator with a relatively strong Lewis acid, to which system a nucleating anion salt is added may be mentioned. Any of these may be used.

The polymerization reaction for synthesis of the precursor of the vinyloxy group-containing vinyl polymer of the present invention is preferably performed in the presence of a suitable organic solvent, but may also be performed in the absence thereof. As said organic solvent, for example, aromatic hydrocarbon-based solvents such as benzene, toluene, xylene; aliphatic hydrocarbon-based solvents such as propane, n-butane, isobutane, n-pentane, isopentane, n-hexane, n-heptane, n-octane, isooctane, decane, hexadecane; halogenated hydrocarbon-based solvents such as methylene chloride, ethylene chloride, carbon tetrachloride; ether-based solvents such as diethyl ether, dibutyl ether, tetrahydrofuran, dioxane, ethyleneglycol diethyl ether may be mentioned, but the present invention is not limited to these examples. Further, the organic solvent may be optionally used alone or any combinations of two or more types.

The polymerization reaction for synthesis of the precursor of the vinyloxy group-containing vinyl polymer of the present invention may be performed by any methods such as batch system, continuous system.

The polymerization temperature at the time of synthesis of the precursor of the vinyloxy group-containing vinyl polymer of the present invention may be suitably selected, depending upon the type of the used polymerization initiators, monomers, solvents, etc., but usually is −80° C. to 150° C., preferably −50° C. to 100° C., particularly preferably −20° C. to 80° C.

The polymerization time at the time of synthesis of the precursor of the vinyloxy group-containing vinyl polymer of the present invention may be suitably selected, depending upon the used polymerization initiators, monomers, solvents, reaction temperatures, etc., but usually is 1 second to 100 hours, preferably 1 second to 24 hours or so.

The retro Diels-Alder reaction method for producing the vinyloxy group-containing vinyl polymer according to the present invention is not particularly limited, but it is possible to use a known method such as using an oil bath, mantle heater, heating gun, microwaves, IR or other heating means for heating under reduced pressure.

EXAMPLES

Examples will now be given to explain the present invention in further detail, but the present invention is not limited to these Examples in any way.

In this Description, "number average molecular weight (hereinafter abbreviated as "Mn")" is calculated by the standard polystyrene conversion method using gel permeation chromatography (hereinafter abbreviated as "GPC").

Synthesis Example 1

[Synthesis of Norbornenyl Vinyl Ether Homopolymer]

Into a sufficiently dried and nitrogen-substituted polymerization tube, 749 mg (5.5 mmol) of norbornenyl vinyl ether, 4.0 ml of toluene and 0.23 ml of diethyl ether were charged. The mixture was cooled to 0° C. After 20 minutes, 63 mg (0.55 mmol) of trifluoroacetic acid was added. After 30 minutes, 0.22 ml (0.22 mmol) of zinc chloride in a diethyl ether solution (1 mol/1) was added to initiate the polymerization. After 1 minute, (1 mol/1) 0.50 ml of ammonia in a methanol solution was added for a polymerization stopping reaction. After the end of the reaction, the reaction solution was diluted with diethyl ether, washed three times with deionized water, then stripped off the solvents in vacuo to obtain 698 mg of the desired product of a norbornenyl vinyl ether homopolymer.

The polymer thus obtained had an Mn of 1060 determined by GPC measurement using polystyrene made by Toso Corp., as a standard substance (the same as below). Furthermore, the polymer thus obtained was measured by $^1$HNMR, whereupon the peaks of the vinyl groups derived from the vinyl ether groups disappeared, while peaks derived from the vinyl groups of the norbornenyl groups were observed at 5.9 to 6.4 ppm.

Synthesis Example 2

[Synthesis of Copolymer of Ethyl Vinyl Ether and Norbornenyl Vinyl Ether]

Except for changing the monomers to mixed monomers of ethyl vinyl ether and norbornenyl vinyl ether in a molar composition ratio of 90/10, the exact same procedure as in Synthesis Example 1, that is, the catalyst, solvent, molar ratio, molar concentration, polymerization reaction temperature, polymerization reaction time and treatment method after polymerization, was used to obtain the desired product.

The polymer thus obtained had an Mn of 1010 by GPC measurement. Furthermore, the polymer thus obtained was measured by $^1$HNMR, whereupon the peaks of the vinyl groups derived from the vinyl ether groups disappeared, while peaks derived from the vinyl groups of the norbornenyl groups were observed at 5.9 to 6.4 ppm.

Synthesis Example 3

[Synthesis of Copolymer of N-Butyl Vinyl Ether and Norbornenyl Vinyl Ether]

Except for changing the monomers to mixed monomers of n-butyl vinyl ether and norbornenyl vinyl ether in a molar composition ratio of 90/10, the exact same procedure as in Synthesis Example 1, that is, the catalyst, solvent, molar ratio, molar concentration, polymerization reaction temperature, polymerization reaction time and treatment method after polymerization, was used to obtain the desired product.

The polymer thus obtained, had an Mn of 1030 by GPC measurement. Furthermore, the polymer thus obtained was measured by $^1$HNMR, whereupon the peaks of the vinyl groups derived from the vinyl ether groups disappeared, while peaks derived from the vinyl groups of the norbornenyl groups were observed at 5.9 to 6.4 ppm.

Synthesis Example 4

[Synthesis of Copolymer of Isobutyl Vinyl Ether and Norbornenyl Vinyl Ether]

Except for changing the monomers to mixed monomers of isobutyl vinyl ether and norbornenyl vinyl ether in a molar composition ratio of 90/10, the exact same procedure as in Synthesis Example 1, that is, the catalyst, solvent, molar ratio, molar concentration, polymerization reaction temperature, polymerization reaction time and treatment method after polymerization, was used to obtain the desired product.

The polymer thus obtained had an Mn of 1080 by GPC measurement. Furthermore, the polymer thus obtained was measured by $^1$HNMR, whereupon the peaks of the vinyl groups derived from the vinyl ether groups disappeared, while peaks derived from the vinyl groups of the norbornenyl groups were observed at 5.9 to 6.4 ppm.

Synthesis Example 5

[Synthesis of Copolymer of Cyclohexyl Vinyl Ether and Norbornenyl Vinyl Ether]

Except for changing the monomers to mixed monomers of cyclohexyl vinyl ether and norbornenyl vinyl ether in a molar composition ratio of 90/10, the exact same procedure as in Synthesis Example 1, that is, the catalyst, solvent, molar ratio, molar concentration, polymerization reaction temperature, polymerization reaction time and treatment method after polymerization, was used to obtain the desired product.

The polymer thus obtained had an Mn of 1120 by GPC measurement. Furthermore, the polymer thus obtained was measured by $^1$HNMR, whereupon the peaks of the vinyl groups derived from the vinyl ether groups disappeared, while peaks derived from the vinyl groups of the norbornenyl groups were observed at 5.9 to 6.4 ppm.

Synthesis Example 6

[Synthesis of Copolymer of Allyl Vinyl Ether and Norbornenyl Vinyl Ether]

Except for changing the monomers to mixed monomers of allyl vinyl ether and norbornenyl vinyl ether in a molar composition ratio of 90/10, the exact same procedure as in Synthesis Example 1, that is, the catalyst, solvent, molar ratio, molar concentration, polymerization reaction temperature, polymerization reaction time and treatment method after polymerization, was used to obtain the desired product.

The polymer thus obtained had an Mn of 1050 by GPC measurement. Furthermore, the polymer thus obtained was measured by $^1$HNMR, whereupon the peaks of the vinyl groups derived from the vinyl ether groups disappeared, while peaks derived from the vinyl groups of the norbornenyl groups were observed at 5.9 to 6.4 ppm.

Synthesis Example 7

[Synthesis of Copolymer of Acetoxydiethyleneglycol Vinyl Ether and Norbornenyl Vinyl Ether]

Except for changing the monomers to mixed monomers of acetoxydiethyleneglycol vinyl ether and norbornenyl vinyl ether in a molar composition ratio of 90/10, the exact same procedure as in Synthesis Example 1, that is, the catalyst, solvent, molar ratio, molar concentration, polymerization reaction temperature, polymerization reaction time and treatment method after polymerization, was used to obtain the desired product.

The polymer thus obtained had an Mn of 1220 by GPC measurement. Furthermore, the polymer thus obtained was measured by $^1$HNMR, whereupon the peaks of the vinyl groups derived from the vinyl ether groups disappeared, while peaks derived from the vinyl groups of the norbornenyl groups were observed at 5.9 to 6.4 ppm.

Example 1

The norbornenyl vinyl ether polymer 200 mg obtained in Synthesis Example 1 was charged into a recovery flask. A three-way cock was attached and the atmosphere was substituted with nitrogen. Thereafter, a vacuum pump was used to reduce the pressure to 1 mbar, then a heating gun was used to heat the polymer at 400° C. for 5 minutes.

The polymer thus obtained, had an Mn of 900 by GPC measurement. Furthermore, the polymer thus obtained was measured by $^1$HNMR, whereupon the peaks derived from the vinyl groups of the norbornenyl groups at 5.9 to 6.4 ppm decreased, and peaks derived from the vinyloxy groups were recognized at 4.3 ppm and 4.0 ppm. Also by $^{13}$CNMR measurement, peaks derived from the vinyloxy groups were observed at 152 ppm and 88 ppm.

Example 2

Except for changing the polymer to the copolymer obtained in Synthesis Example 2, the exact same conditions as Example 1 were used to obtain the desired product.

The polymer thus obtained had an Mn of 980 by GPC measurement. Furthermore, the polymer thus obtained was measured by $^1$HNMR, whereupon the peaks derived from the vinyl groups of the norbornenyl groups at 5.9 to 6.4 ppm decreased, and peaks derived from the vinyloxy groups were recognized at 4.3 ppm and 4.0 ppm. Also by $^{13}$CNMR measurement, peaks derived from the vinyloxy groups were observed at 152 ppm and 88 ppm.

Example 3

Except for changing the polymer to the copolymer obtained in Synthesis Example 3, the exact same conditions as Example 1 were used to obtain the desired product.

The polymer thus obtained had an Mn of 990 by GPC measurement. Furthermore, the polymer thus obtained was measured by $^1$HNMR, whereupon the peaks derived from the vinyl groups of the norbornenyl groups at 5.9-6.4 ppm decreased, and peaks derived from the vinyloxy groups were recognized at 4.3 ppm and 4.0 ppm. Also by $^{13}$CNMR measurement, peaks derived from the vinyloxy groups were observed at 152 ppm and 88 ppm.

Example 4

Except for changing the polymer to the copolymer obtained in Synthesis Example 4, the exact same conditions as Example 1 were used to obtain the desired product.

The polymer thus obtained had an Mn of 1040 by GPC measurement. Furthermore, the polymer thus obtained was measured by $^1$HNMR, whereupon the peaks derived from the vinyl groups of the norbornenyl groups at 5.9 to 6.4 ppm decreased, and peaks derived from the vinyloxy groups were recognized at 4.3 ppm and 4.0 ppm. Also by $^{13}$CNMR measurement, peaks derived from the vinyloxy groups were observed at 152 ppm and 88 ppm.

Example 5

Except for changing the polymer to the copolymer obtained in Synthesis Example 5, the exact same conditions as Example 1 were used to obtain the desired product.

The polymer thus obtained had an Mn of 1080 by GPC measurement. Furthermore, the polymer thus obtained was measured by $^1$HNMR, whereupon the peaks derived from the vinyl groups of the norbornenyl groups at 5.9 to 6.4 ppm decreased, and peaks derived from the vinyloxy groups were recognized at 4.3 ppm and 4.0 ppm. Also by $^{13}$CNMR measurement, peaks derived from the vinyloxy groups were observed at 152 ppm and 88 ppm.

Example 6

Except for changing the polymer to the copolymer obtained in Synthesis Example 6, the exact same conditions as Example 1 were used to obtain the desired product.

The polymer thus obtained had an Mn of 1020 by GPC measurement. Furthermore, the polymer thus obtained was measured by $^1$HNMR, whereupon the peaks derived from the vinyl groups of the norbornenyl groups at 5.9 to 6.4 ppm decreased, and peaks derived from the vinyloxy groups were recognized at 4.3 ppm and 4.0 ppm. Also by $^{13}$CNMR measurement, peaks derived from the vinyloxy groups were observed at 152 ppm and 88 ppm.

Example 7

Except for changing the polymer to the copolymer obtained in Synthesis Example 7, the exact same conditions as Example 1 were used to obtain the desired product.

The polymer thus obtained had an Mn of 1180 by GPC measurement. Furthermore, the polymer thus obtained was measured by $^1$HNMR, whereupon the peaks derived from the vinyl groups of the norbornenyl groups at 5.9 to 6.4 ppm decreased, and peaks derived from the vinyloxy groups were recognized at 4.3 ppm and 4.0 ppm. Also by $^{13}$CNMR measurement, peaks derived from the vinyloxy groups were observed at 152 ppm and 88 ppm.

INDUSTRIAL APPLICABILITY

The vinyloxy group-containing vinyl polymer according to the present invention is not only superior in storage stability, but is also superior in transparency. Therefore, it is useful as ink materials such as an ink jet ink, optical materials such as lenses, liquid crystal films, various types of coating materials and adhesive materials. Furthermore, the vinyloxy group-containing vinyl polymer according to the present invention is extremely low in toxicity and is superior in safety. Therefore, it is useful for medical use adhesives and other fields where high safety is required.

The invention claimed is:

1. A vinyloxy group-containing vinyl polymer comprising constituent units expressed by the following (a) and (b):
   (a) a constituent unit expressed by the following formula (I) having a vinyloxy group at the side chain thereof:

(b) a constituent unit expressed by the following formula (II):

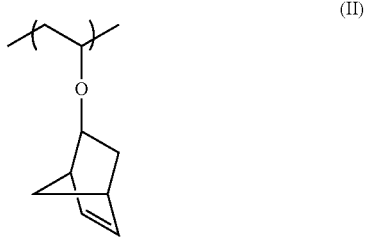

2. A vinyloxy group-containing vinyl polymer comprising the following constituent units (a), (b) and (c):
   (a) a constituent unit expressed by the following formula (I) having a vinyloxy group at the side chain thereof:

(b) a constituent unit expressed by the following formula (II):

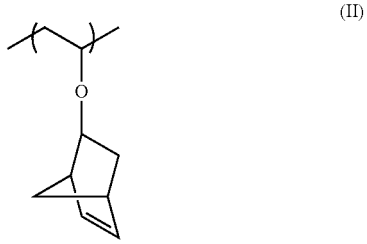

(c) a constituent unit derived from vinyl ether expressed by the following formula (III):

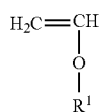

wherein R¹ indicates a monovalent organic group.

3. A vinyloxy group-containing vinyl copolymer as claimed in claim 2, wherein the vinyl ether expressed by said formula (III) is selected from the group consisting of methyl vinyl ether, ethyl vinyl ether, n-propyl vinyl ether, isopropyl vinyl ether, n-butyl vinyl ether, sec-butyl vinyl ether, tert-butyl vinyl ether, isobutyl vinyl ether, (1-ethylpropyl) vinyl ether, neopentyl vinyl ether, n-hexyl vinyl ether, cyclohexyl vinyl ether, (cyclohexylmethyl)vinyl ether, 2-ethylhexyl vinyl ether, dodecyl vinyl ether, octadecyl vinyl ether, allyl vinyl ether, norbornyl vinyl ether, norbornenyl vinyl ether, norbornylmethyl vinyl ether, norbornenylmethyl vinyl ether, 2-acetoxyethyl vinyl ether, 4-acetoxycyclohexyl vinyl ether, 1-acetoxymethyl-4-cyclohexylmethyl vinyl ether, acetoxy diethylene glycol monovinyl ether, and acetoxy triethylene glycol monovinyl ether.

4. An ink composition comprising a vinyloxy group-containing vinyl polymer comprising a constituent unit expressed by the following formula (I):

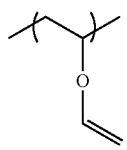

5. A medical use adhesive comprising a vinyloxy group-containing vinyl polymer comprising a constituent unit expressed by the following formula (I):

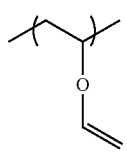

6. A coating composition comprising a vinyloxy group-containing vinyl polymer comprising a constituent unit expressed by the following formula (I):

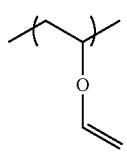

7. An ink composition comprising a vinyloxy group-containing vinyl polymer according to claim 1.

8. An ink composition comprising a vinyloxy group-containing vinyl polymer according to claim 2.

9. An ink composition comprising a vinyloxy group-containing vinyl polymer comprising the following constituent units (a) and (c):

(a) a component unit expressed by the following formula (I) having a vinyloxy group at the side chain thereof:

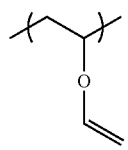

(c) a constituent unit derived from vinyl ether expressed by the following formula (III):

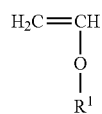

wherein R¹ indicates a monovalent organic group.

10. An ink composition comprising a vinyloxy group-containing vinyl polymer according to claim 3.

11. An ink composition comprising a vinyloxy group-containing vinyl polymer according to claim 9 wherein the vinyl ether expressed by said formula (III) is selected from the group consisting of methyl vinyl ether, ethyl vinyl ether, n-propyl vinyl ether, isopropyl vinyl ether, n-butyl vinyl ether, sec-butyl vinyl ether, tert-butyl vinyl ether, isobutyl vinyl ether, (1-ethylpropyl) vinyl ether, neopentyl vinyl ether, n-hexyl vinyl ether, cyclohexyl vinyl ether, (cyclohexylmethyl)vinyl ether, 2-ethylhexyl vinyl ether, dodecyl vinyl ether, octadecyl vinyl ether, allyl vinyl ether, norbornyl vinyl ether, norbornenyl vinyl ether, norbornylmethyl vinyl ether, norbornenylmethyl vinyl ether, 2-acetoxyethyl vinyl ether, 4-acetoxycyclohexyl vinyl ether, 1-acetoxymethyl-4-cyclohexylmethyl vinyl ether, acetoxy diethylene glycol monovinyl ether, and acetoxy triethylene glycol monovinyl ether.

12. A medical use adhesive comprising a vinyloxy group-containing vinyl polymer according to claim 1.

13. A medical use adhesive comprising a vinyloxy group-containing vinyl polymer according to claim 2.

14. A medical use adhesive comprising a vinyloxy group-containing vinyl polymer comprising the following constituent units (a) and (c):

(a) a component unit expressed by the following formula (I) having a vinyloxy group at the side chain thereof:

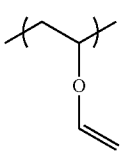

(c) a constituent unit derived from vinyl ether expressed by the following formula (III):

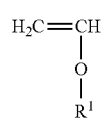

(III)

wherein R¹ indicates a monovalent organic group.

15. A medical use adhesive comprising a vinyloxy group-containing vinyl polymer according to claim 3.

16. A medical use adhesive comprising a vinyloxy group-containing vinyl polymer according to claim 14, wherein the vinyl ether expressed by said formula (III) is selected from the group consisting of methyl vinyl ether, ethyl vinyl ether, n-propyl vinyl ether, isopropyl vinyl ether, n-butyl vinyl ether, sec-butyl vinyl ether, tert-butyl vinyl ether, isobutyl vinyl ether, (1-ethylpropyl) vinyl ether, neopentyl vinyl ether, n-hexyl vinyl ether, cyclohexyl vinyl ether, (cyclohexylmethyl)vinyl ether, 2-ethylhexyl vinyl ether, dodecyl vinyl ether, octadecyl vinyl ether, allyl vinyl ether, norbornyl vinyl ether, norbornenyl vinyl ether, norbornylmethyl vinyl ether, norbornenylmethyl vinyl ether, 2-acetoxyethyl vinyl ether, 4-acetoxycyclohexyl vinyl ether, 1-acetoxymethyl-4-cyclohexylmethyl vinyl ether, acetoxy diethylene glycol monovinyl ether, and acetoxy triethylene glycol monovinyl ether.

17. A coating composition comprising a vinyloxy group-containing vinyl polymer according to claim 1.

18. A coating composition comprising a vinyloxy group-containing vinyl polymer according to claim 2.

19. A coating composition comprising a vinyloxy group-containing vinyl polymer comprising the following constituent units (a) and (c):

(a) a component unit expressed by the following formula (I) having a vinyloxy group at the side chain thereof:

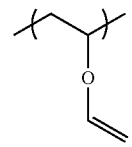

(I)

(c) a constituent unit derived from vinyl ether expressed by the following formula (III):

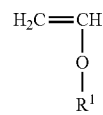

(III)

wherein R¹ indicates a monovalent organic group.

20. A coating composition comprising a vinyloxy group-containing vinyl polymer according to claim 3.

21. A coating composition comprising a vinyloxy group-containing vinyl polymer according to claim 19, wherein the vinyl ether expressed by said formula (III) is selected from the group consisting of methyl vinyl ether, ethyl vinyl ether, n-propyl vinyl ether, isopropyl vinyl ether, n-butyl vinyl ether, sec-butyl vinyl ether, tert-butyl vinyl ether, isobutyl vinyl ether, (1-ethylpropyl) vinyl ether, neopentyl vinyl ether, n-hexyl vinyl ether, cyclohexyl vinyl ether, (cyclohexylmethyl)vinyl ether, 2-ethylhexyl vinyl ether, dodecyl vinyl ether, octadecyl vinyl ether, allyl vinyl ether, norbornyl vinyl ether, norbornenyl vinyl ether, norbornylmethyl vinyl ether, norbornenylmethyl vinyl ether, 2-acetoxyethyl vinyl ether, 4-acetoxycyclohexyl vinyl ether, 1-acetoxymethyl-4-cyclohexylmethyl vinyl ether, acetoxy diethylene glycol monovinyl ether, and acetoxy triethylene glycol monovinyl ether.

\* \* \* \* \*